United States Patent
Shimizu

(10) Patent No.: US 11,446,917 B2
(45) Date of Patent: Sep. 20, 2022

(54) ADDITIVE MANUFACTURING DEVICE AND ADDITIVE MANUFACTURING METHOD

(71) Applicant: IHI Corporation, Tokyo (JP)

(72) Inventor: Riku Shimizu, Tokyo (JP)

(73) Assignee: IHI CORPORATION, Tokyo (JP)

(*) Notice: Subject to any disclaimer, the term of this patent is extended or adjusted under 35 U.S.C. 154(b) by 191 days.

(21) Appl. No.: 16/652,868

(22) PCT Filed: Oct. 4, 2018

(86) PCT No.: PCT/JP2018/037237
§ 371 (c)(1),
(2) Date: Apr. 1, 2020

(87) PCT Pub. No.: WO2019/070034
PCT Pub. Date: Apr. 11, 2019

(65) Prior Publication Data
US 2020/0247109 A1    Aug. 6, 2020

(30) Foreign Application Priority Data
Oct. 6, 2017    (JP) .............................. JP2017-196149

(51) Int. Cl.
*B33Y 10/00*    (2015.01)
*B33Y 30/00*    (2015.01)
(Continued)

(52) U.S. Cl.
CPC .............. *B33Y 10/00* (2014.12); *B33Y 30/00* (2014.12); *B22F 10/10* (2021.01); *B22F 12/00* (2021.01);
(Continued)

(58) Field of Classification Search
CPC ................... B22F 10/30; B22F 3/1055; B22F 2003/1056; B22F 2003/1057; B22F 2003/1058; B22F 2003/1059; B22F 10/20; B22F 2203/03; B22F 2998/10; B22F 2999/00; B22F 10/10; B22F 12/00; B29C 64/30; B29C 64/386; B29C 64/393;
(Continued)

(56) References Cited

U.S. PATENT DOCUMENTS

| 2004/0026807 A1 | 2/2004 | Andersson et al. |
| 2009/0152771 A1 | 6/2009 | Philippi et al. |

(Continued)

FOREIGN PATENT DOCUMENTS

| CN | 104023948 A | 9/2014 |
| CN | 106001571 A | 10/2016 |

(Continued)

*Primary Examiner* — Philip C Tucker
*Assistant Examiner* — Jimmy R Smith, Jr.
(74) *Attorney, Agent, or Firm* — Volpe Koenig

(57) ABSTRACT

An additive manufacturing device is provided with a beam irradiation unit irradiating a conductive powder disposed in a layered shape with a beam, a nondestructive inspection unit detecting a flaw in a surface layer of an additively manufactured article formed of the hardened conductive powder, and an energy control unit controlling energy of the beam. The energy control unit increases energy of a beam when a repairing region set in accordance with results of flaw detection by the nondestructive inspection unit is irradiated with the beam.

4 Claims, 5 Drawing Sheets

(51) Int. Cl.
  *B33Y 50/02* (2015.01)
  *B29C 64/153* (2017.01)
  *B29C 64/393* (2017.01)
  *B22F 12/00* (2021.01)
  *B22F 10/10* (2021.01)

(52) U.S. Cl.
  CPC ....... *B22F 2998/10* (2013.01); *B22F 2999/00* (2013.01); *B29C 64/153* (2017.08); *B29C 64/393* (2017.08); *B33Y 50/02* (2014.12)

(58) Field of Classification Search
  CPC ....... B29C 70/00; B29C 70/24; B29C 64/153; B29C 64/268; B33Y 50/00; B33Y 50/02; B33Y 10/00; B33Y 30/00; B23K 31/125; B23K 15/002; B23K 15/0086; G01N 27/904
  See application file for complete search history.

(56) References Cited

U.S. PATENT DOCUMENTS

| | | | |
|---|---|---|---|
| 2014/0159266 A1* | 6/2014 | Bamberg | B23K 26/702 264/40.1 |
| 2014/0308153 A1 | 10/2014 | Ljungblad | |
| 2016/0214319 A1* | 7/2016 | Wiel | B22F 10/00 |
| 2018/0071987 A1* | 3/2018 | Tsumuraya | B22F 10/20 |
| 2018/0166251 A1 | 6/2018 | Yuan et al. | |
| 2018/0264590 A1* | 9/2018 | Goldfine | B23K 26/123 |
| 2019/0039139 A1 | 2/2019 | Ljungblad | |
| 2019/0039140 A1 | 2/2019 | Ljungblad | |

FOREIGN PATENT DOCUMENTS

| | | | |
|---|---|---|---|
| CN | 106018288 A | 10/2016 | |
| EP | 2832475 A2 | 2/2015 | |
| EP | 3095539 A1 | 11/2016 | |
| EP | 3095539 B1 | 7/2020 | |
| JP | 08-334498 A | 12/1996 | |
| JP | 10-282065 A | 10/1998 | |
| JP | 2003-531034 A | 10/2003 | |
| JP | 2010-520091 A | 6/2010 | |
| JP | 2016-533432 A | 10/2016 | |
| JP | 2017-020422 A | 1/2017 | |
| WO | 2016/143137 A1 | 9/2016 | |
| WO | 2017/163403 A1 | 9/2017 | |

* cited by examiner

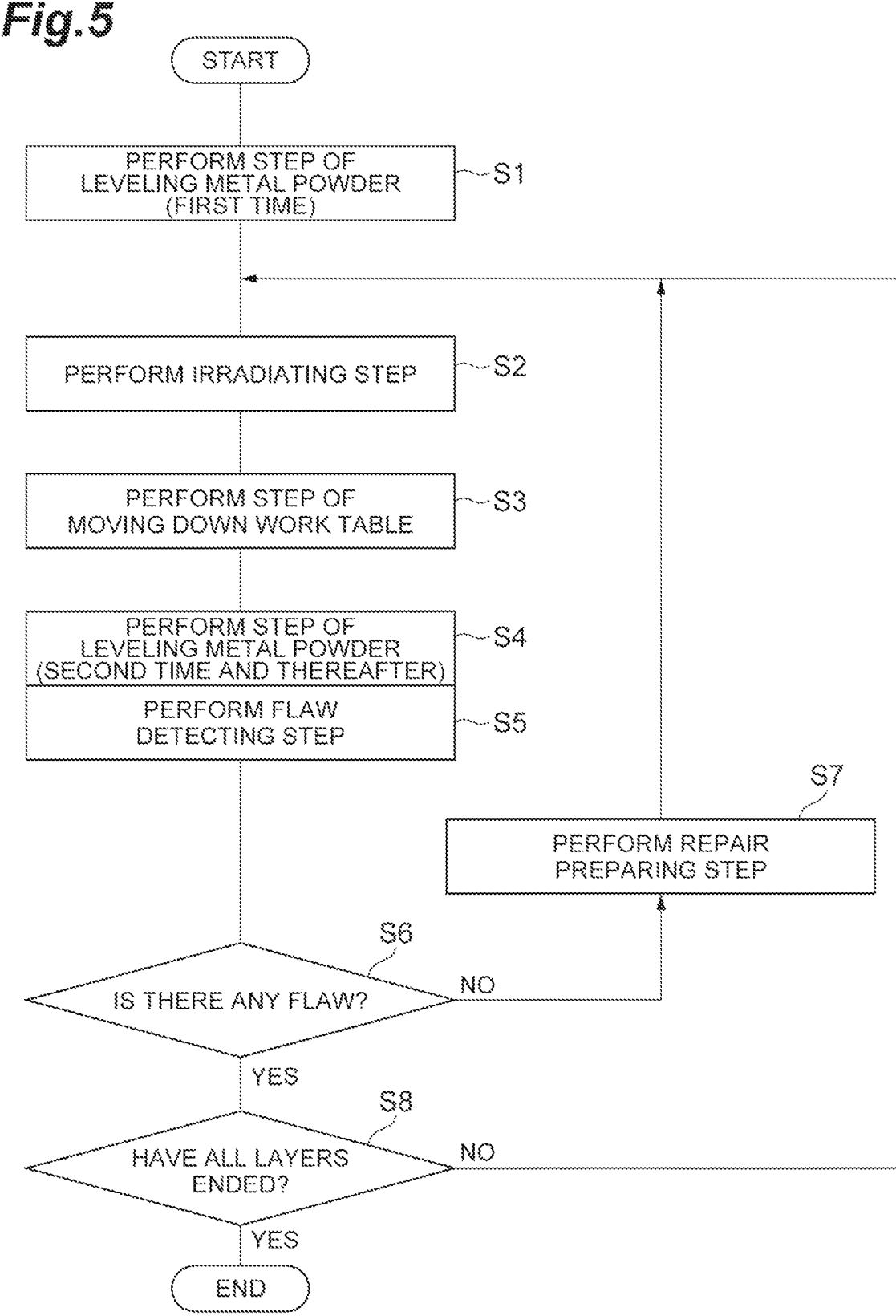

ADDITIVE MANUFACTURING DEVICE AND ADDITIVE MANUFACTURING METHOD

TECHNICAL FIELD

The present disclosure relates to an additive manufacturing device and an additive manufacturing method.

BACKGROUND ART

In the related art, there is a device manufacturing a three-dimensional product by disposing a powder that is a raw material on a work table in a layered shape and applying energy to selected parts of this powder layer such that they are sequentially melted (for example, refer to Patent Literature 1). In such a device manufacturing a three-dimensional product, one powder layer is partially melted, and after the melted powder is hardened, another powder layer is formed thereon. Moreover, selected parts are melted and hardened, and thus a three-dimensional product is manufactured by repeating this process.

CITATION LIST

Patent Literature

Patent Literature 1: Japanese Unexamined Patent Publication No. 2003-531034

SUMMARY OF INVENTION

Technical Problem

In the related art, a three-dimensional product having a flaw has not been utilized as a product and has been discarded as a defective product. The foregoing Patent Literature 1 does not describe how to deal with a three-dimensional product having a flaw. An object of the present disclosure is to provide an additive manufacturing device and an additive manufacturing method, in which a flaw in a surface layer can be detected and the detected flaw can be repaired.

Solution to Problem

An additive manufacturing device of the present disclosure is provided with a beam irradiation unit irradiating a conductive powder disposed in a layered shape with a beam, a nondestructive inspection unit detecting a flaw in a surface layer of an additively manufactured article formed of the hardened conductive powder, and an energy control unit controlling energy of the beam. The energy control unit increases energy of a beam when a repairing region set in accordance with results of flaw detection by the nondestructive inspection unit is irradiated with the beam.

Effects of Invention

According to the present disclosure, it is possible to provide an additive manufacturing device and an additive manufacturing method, in which a flaw in a surface layer can be detected and the detected flaw can be repaired.

BRIEF DESCRIPTION OF DRAWINGS

FIG. 5 is a flowchart showing a procedure of an additive manufacturing method of the embodiment.

DESCRIPTION OF EMBODIMENT

Figure 1:
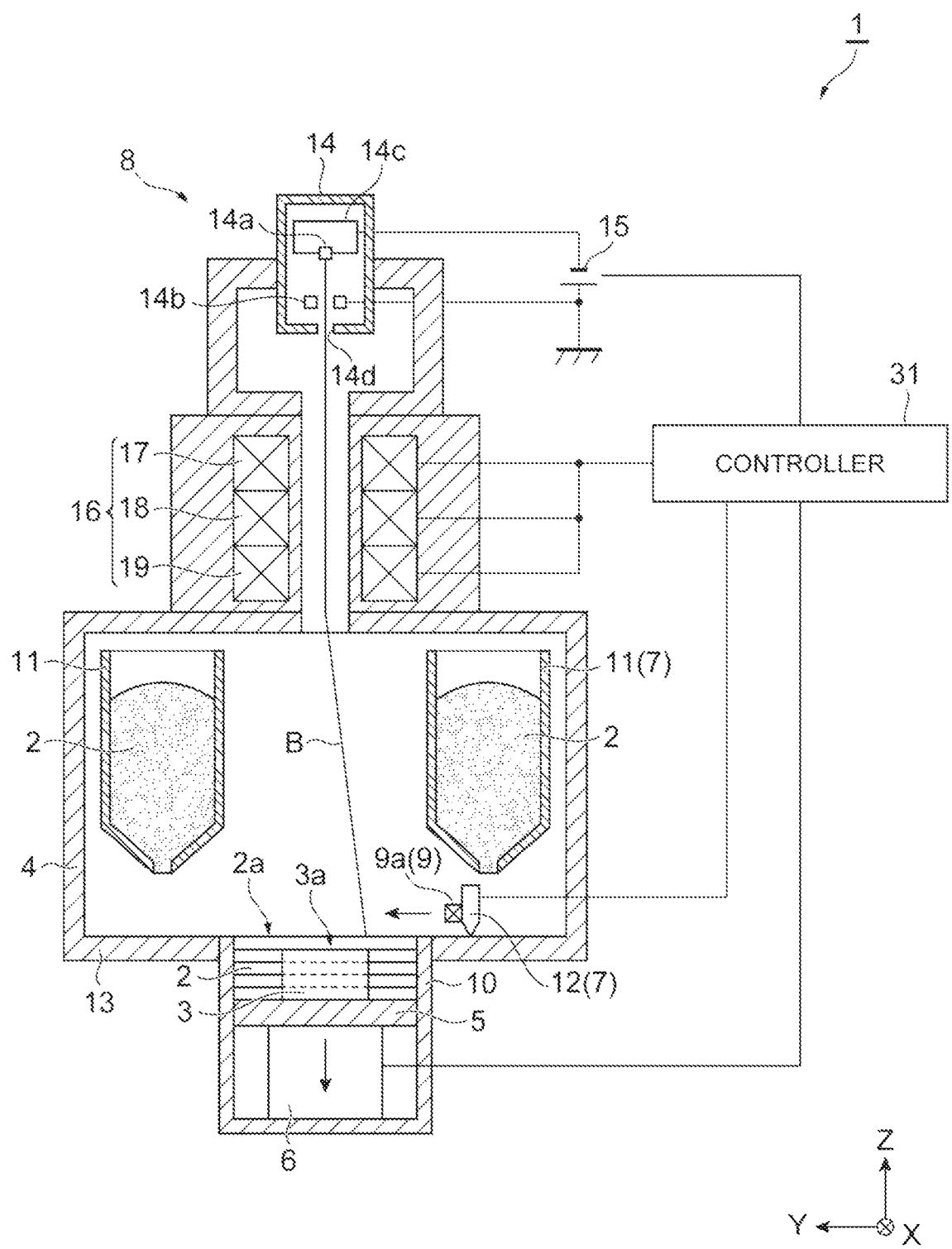
FIG. 1 is a constitution diagram illustrating an additive manufacturing device of an embodiment.

According to the present disclosure, there is provided an additive manufacturing device including a beam irradiation unit irradiating a conductive powder disposed in a layered shape with a beam, a nondestructive inspection unit detecting a flaw in a surface layer of an additively manufactured article formed of the hardened conductive powder, and an energy control unit controlling energy of the beam. The energy control unit increases energy of a beam when a repairing region set in accordance with results of flaw detection by the nondestructive inspection unit is irradiated with the beam.

This additive manufacturing device is provided with the nondestructive inspection unit. Therefore, a flaw in the surface layer of the additively manufactured article can be detected by this nondestructive inspection unit. The additive manufacturing device is provided with the energy control unit. Therefore, when the repairing region including a flaw detected by the nondestructive inspection unit is irradiated with a beam, energy of the beam can be increased. Accordingly, while a next conductive powder layer is irradiated with a beam, the additive manufacturing device can apply energy of the beam to a flaw present in the layer below thereof. The additive manufacturing device can repair a flaw.

The beam irradiation unit may be provided with an electron gun performing irradiation of an electron ray serving as the beam, an acceleration power source supplying an acceleration voltage to the electron gun, and a coil portion forming a magnetic field in a region in front of an irradiation port of the electron gun. The energy control unit may include an acceleration voltage control unit controlling the acceleration voltage, and a coil control unit controlling the coil portion. Accordingly, an additively manufactured article can be manufactured by irradiating a conductive powder with an electron ray from the electron gun such that the conductive powder is melted and hardened. The acceleration voltage control unit may increase the acceleration voltage when the repairing region is irradiated with the electron ray. Accordingly, while a next conductive powder layer is irradiated with an electron ray by increasing energy of the electron ray, the energy of the electron ray can be applied to a flaw present in the layer below thereof. As a result, the additive manufacturing device can melt and repair the flaw.

The coil control unit may reduce a scanning speed of the electron ray when the repairing region is irradiated with the electron ray. Accordingly, energy applied to a region irradiated with the electron ray can be increased. Therefore, while a next conductive powder layer is irradiated with an electron ray, energy of a beam can be applied to a flaw present in the layer below thereof. The additive manufacturing device can melt and repair the flaw.

According to the present disclosure, there is provided an additive manufacturing method for manufacturing an additively manufactured article by irradiating a conductive powder disposed in a layered shape with a beam and melting and hardening the conductive powder. The additive manufacturing method includes a melting step of melting the conductive powder of a first layer by irradiating the conductive powder of the first layer held by a holding unit with the beam, a nondestructive inspection step of detecting a flaw in a surface layer of the additively manufactured article after the conductive powder of the first layer has been melted and hardened, a laminating step of laminating the conductive powder of a second layer on the additively manufactured article, and a repairing step of repairing a region set in accordance with results of flaw detection in the nondestructive inspection step. In the repairing step, when the conductive powder of the second layer is irradiated with the beam, the region is repaired by increasing the energy of the beam.

In this additive manufacturing method, a flaw in a surface layer of the additively manufactured article can be detected by performing the nondestructive inspection step. In the repairing step of this additive manufacturing method, when a conductive powder of the second layer laminated on the additively manufactured article is irradiated with a beam, energy of the beam can be increased. Therefore, a region including a detected flaw can be repaired. Accordingly, the additively manufactured article can be manufactured by melting a conductive powder of the second layer while a flaw included in the first layer is repaired.

Hereinafter, a preferable embodiment of the present disclosure will be described in detail with reference to the drawings. The same reference signs are applied to the same parts or corresponding parts in description of each of the drawings, and duplicate description will be omitted.

An additive manufacturing device (which will hereinafter be referred to as "a manufacturing device") 1 illustrated in FIG. 1 is a so-called 3D printer, which can melt or sinter a metal powder (conductive powder) 2 by partially applying energy to the metal powder 2 disposed in a layered shape. The manufacturing device 1 manufactures a three-dimensional component (additively manufactured article) 3 by repeating melting or sintering a plurality of times. For example, the three-dimensional component 3 is a machine component or the like, and it may be a different structure. Examples of a metal powder include a titanium-based metal powder, an Inconel (registered trademark) powder, and an aluminum powder. The conductive powder is not limited to a metal powder. For example, it may be a powder such as carbon fiber reinforced plastics (CFRP) including carbon fibers and a resin and may be a different conductive powder.

The manufacturing device 1 is provided with a vacuum chamber 4, a work table (holding unit) 5, an elevating device 6, a powder supply device 7, an electron ray irradiation device (beam irradiation unit) 8, a nondestructive inspection device 9, and a controller 31. The vacuum chamber 4 is a container internally having a vacuum (low pressure) state, and a vacuum pump (not illustrated) is connected thereto. For example, the work table 5 illustrated in FIG. 2 exhibits a plate shape and is a holding unit in which the metal powder 2 that is a raw material for the three-dimensional component 3 is disposed. For example, the metal powder 2 on the work table 5 is disposed in a layered shape a plurality of times. The work table 5 exhibits a rectangular shape in a plan view, for example. The shape of the work table 5 is not limited to a rectangular shape and it may be a circular shape or may be a different shape. The work table 5 is disposed in a recessed portion recessed downward in a bottom portion inside the vacuum chamber 4, for example. The work table 5 can move in a Z direction (up-down direction) and it sequentially moves downward in accordance with the number of layers of the metal powder 2. A guide portion 10 guiding movement of the work table 5 is provided in an outer circumference of the work table 5. The guide portion 10 exhibits a quadrangular tube shape (a cylindrical shape when the work table has a circular shape) such that it corresponds to the external shape of the work table 5. The guide portion 10 and the work table 5 form an accommodation portion accommodating the metal powder 2 and the shaped three-dimensional component 3. The work table 5 can move in the Z direction on the inward side of the guide portion 10. For example, the guide portion 10 constitutes a part of the vacuum chamber 4.

The elevating device 6 elevates the work table 5. For example, the elevating device 6 includes a rack-and-pinion type driving mechanism and moves the work table 5 in the Z direction. The elevating device 6 includes an up-down direction member (rack) which is joined to a bottom surface of the work table 5 and has a rod shape extending downward, and a drive source for driving this up-down direction member. Regarding the drive source, for example, an electric motor can be used. A pinion is provided in an output shaft of the electric motor, and a teeth form meshing with the pinion is provided on a side surface of the up-down direction member. When the electric motor is driven, the pinion rotates, power is transmitted, and the up-down direction member moves in the up-down direction. When rotation of the electric motor is stopped, the position of the up-down direction member is set, the position of the work table 5 in the Z direction is set, and the positions thereof are held. An up-down direction position adjusting mechanism is not limited to a rack-and-pinion type driving mechanism. For example, the up-down direction position adjusting mechanism may be provided with other driving mechanisms such as a ball screw and a cylinder.

The powder supply device 7 illustrated in FIG. 1 is provided with raw material tanks 11 which are reserving units for reserving the metal powder 2, and a powder applying mechanism 12 which levels the metal powder 2. The raw material tanks 11 and the powder applying mechanism 12 are disposed inside the vacuum chamber 4. The raw material tanks 11 are disposed above the work table 5 in the Z direction. For example, the raw material tanks 11 are disposed on both sides of the work table 5 in a Y direction intersecting the Z direction. An overhanging plate 13 is provided below the raw material tanks 11. The overhanging plate 13 laterally extends from an upper end portion of the guide portion 10. The overhanging plate 13 forms a flat surface intersecting the Z direction around the work table 5. The metal powders 2 reserved in the raw material tanks 11 flow out from the raw material tanks 11 and are deposited on the overhanging plate 13.

The powder applying mechanism 12 can move in the Y direction above the work table 5 and the overhanging plate 13. The powder applying mechanism 12 collects the metal powder 2 deposited on the overhanging plate 13 on the work table 5 and levels an outer surface (upper surface) 2a of the uppermost layer of a laminate of the metal powder 2 on the work table 5. A lower end portion of the powder applying mechanism 12 abuts the outer surface 2a of the laminate of the metal powder 2 and makes the height uniform. For example, the powder applying mechanism 12 exhibits a plate shape and has a predetermined width in an X direction. The X direction is a direction intersecting the Z direction and the Y direction. The length of the powder applying mechanism 12 in the X direction corresponds to the overall length of the work table 5 in the X direction, for example. The manufacturing device 1 may have a constitution provided with a roller portion, a rod-shaped member, a brush portion, or the like, in place of the powder applying mechanism 12.

The electron ray irradiation device 8 is provided with an electron gun 14, an acceleration power source 15, and a coil portion 16. The electron gun 14 includes a cathode 14a, an anode 14b, and a filament 14c. The cathode 14a, the anode 14b, and the filament 14c are electrically connected to the acceleration power source 15. A negative electrode of the acceleration power source 15 is earthed. The acceleration voltage is −60 kv, for example. The acceleration voltage is a potential difference between the cathode 14a and the anode 14b. The cathode 14a is heated by the filament 14c. Electrons are discharged from the heated cathode 14a. Electrons are accelerated in accordance with the potential difference between the cathode 14a and the anode 14b. The inside of the vacuum chamber 4 is irradiated with an electron beam (electron ray) B through an irradiation port 14d of the electron gun 14.

The coil portion 16 forms a magnetic field in a region in front of the irradiation port 14d of the electron gun 14. The region in front thereof is a region in front in an irradiation direction of the electron beam B. The coil portion 16 is provided with an aberration coil 17, a focus coil 18, and a deflection coil 19. The aberration coil 17, the focus coil 18, and the deflection coil 19 are disposed in this order from the electron gun 14 side in the irradiation direction of the electron beam B, for example. The aberration coil 17 is installed around the electron beam B emitted from the electron gun 14 and causes the electron beam B to converge. The focus coil 18 is installed around the electron beam B emitted from the electron gun 14 and corrects deviation of a focus position of the electron beam B. The deflection coil 19 is installed around the electron beam B emitted from the electron gun 14 and adjusts an irradiation position of the electron beam B. Since the deflection coil 19 performs electromagnetic beam deflection, the scanning speed at the time of irradiation of the electron beam B can be faster than that in mechanical beam deflection. The electron gun 14 and the coil portion 16 are disposed in an upper portion of the vacuum chamber 4. The electron beam B emitted from the electron gun 14 is caused to converge by the coil portion 16 and a focal point position is corrected. The electron beam B, of which the scanning speed is controlled, reaches the irradiation position of the metal powder 2.

Figure 2:
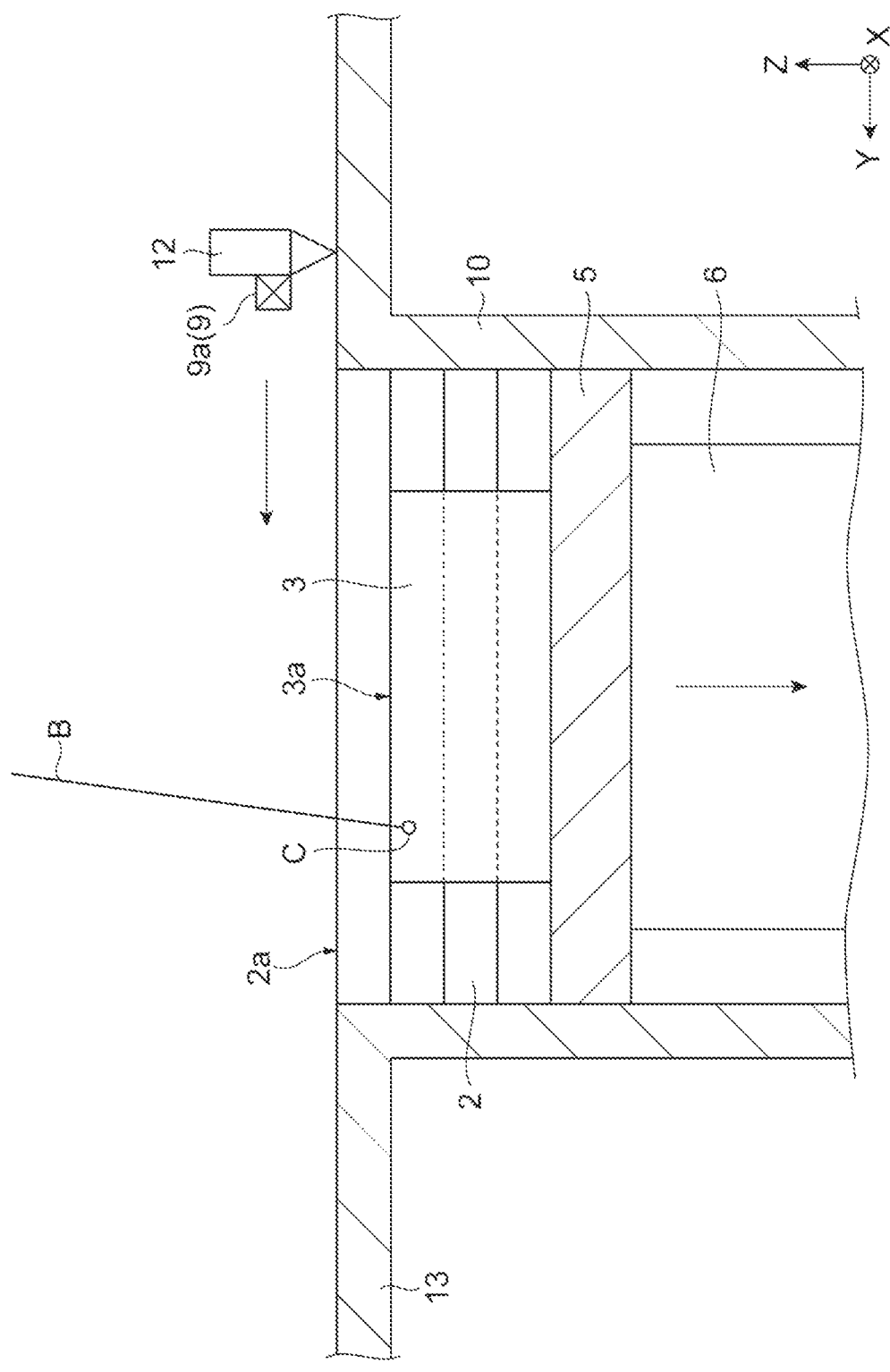
FIG. 2 is a cross-sectional view illustrating an additively manufactured article in which an internal flaw is detected.
Figure 4:
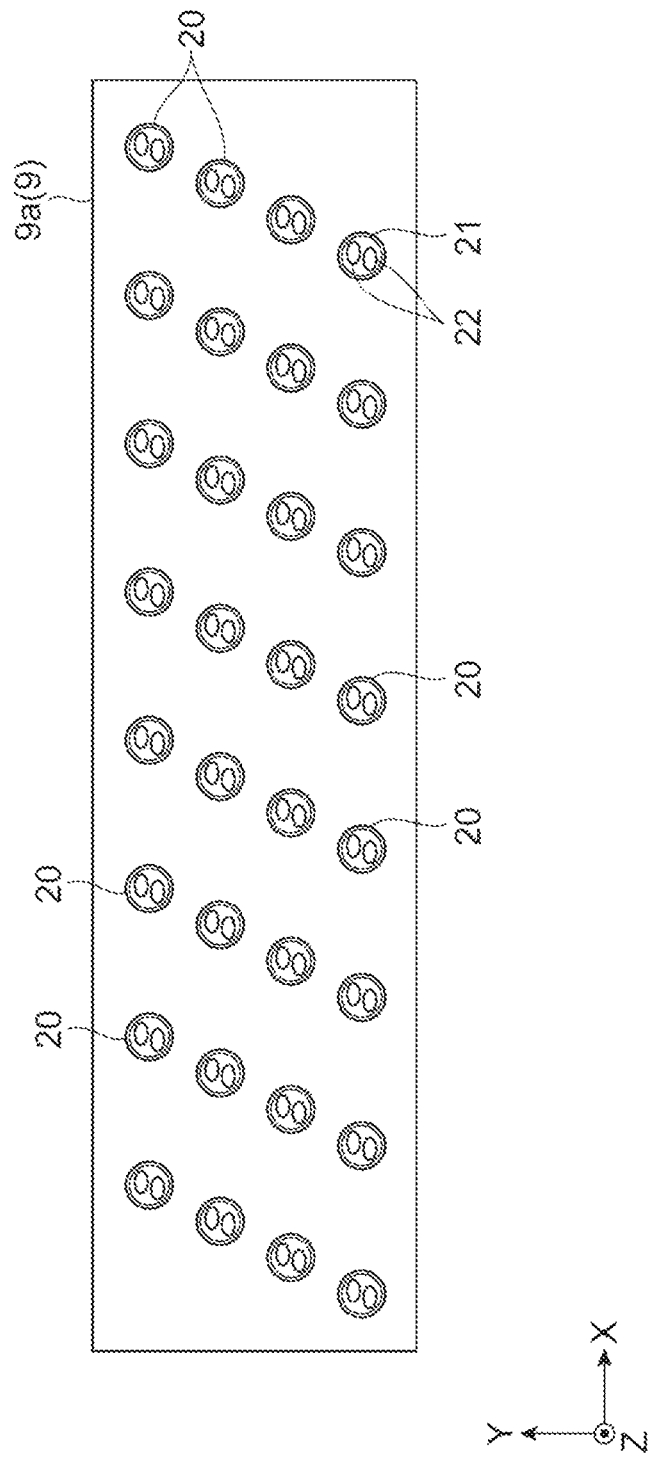
FIG. 4 is a view from above illustrating disposition of inspection coils in a probe in FIG. 3.

The nondestructive inspection device 9 illustrated in FIG. 2 is provided with a probe (nondestructive inspection unit) 9a detecting a flaw in a surface layer 3a of the three-dimensional component 3. The probe 9a is attached to the powder applying mechanism 12. The probe 9a can move in the Y direction together with the powder applying mechanism 12. The probe 9a may be constituted to be able to move separately from the powder applying mechanism 12. The bottom surface of the probe 9a is disposed above the lower end of the powder applying mechanism 12. A gap is formed between the bottom surface of the probe 9a and the outer surface 2a of the laminate of the metal powder 2. The probe 9a does not come into contact with the metal powder 2 and the three-dimensional component 3. The probe 9a extends in the X direction intersecting the Y direction which is a scanning direction of the probe 9a. As illustrated in FIG. 4, the probe 9a includes a plurality of inspection coils 20 disposed side by side in the X direction. The probe 9a includes a plurality of rows of inspection coils 20 disposed side by side in the X direction. The plurality of rows of inspection coils 20 are disposed side by side in the Y direction. For example, the inspection coils 20 of the probe 9a are accommodated inside a casing exhibiting a box shape. In the illustrated example, the probe 9a is disposed on the front side in a moving direction of the powder applying mechanism 12. The probe 9a may be disposed on the rear side in the moving direction of the powder applying mechanism 12. After the metal powder 2 is leveled by the powder applying mechanism 12, the probe 9a may detect a flaw while passing over above the metal powder 2.

Each of the inspection coils 20 illustrated in FIG. 4 is provided with an excitation coil 21 and a pair of detection coils 22. An alternating current is supplied to the excitation coil 21, and a magnetic field is generated. Accordingly, the excitation coil 21 can generate an eddy current in the surface layer 3a of the three-dimensional component 3. For example, the excitation coil 21 is formed around an axis extending in the Z direction. The pair of detection coils 22 are disposed on the inward side of the excitation coil 21. For example, the detection coils 22 are formed around the axis extending in the Z direction. Ferrite cores (iron cores) are disposed on the inward sides of the detection coils 22. For example, the ferrite core exhibits a rod shape extending in the Z direction. The ferrite core may have a columnar shape or may have a prismatic shape. The pair of detection coils 22 detect a change in magnetic field caused by the eddy current of the surface layer 3a. The surface layer 3a may include an outer surface of the three-dimensional component 3 and an internal part in the vicinity of the outer surface. For example, the surface layer 3a may include a region to a depth of 1 mm from the outer surface. For example, the surface layer 3a may include a region to a depth of 2 mm or may include a region at a different depth. Regarding the surface layer 3a of the three-dimensional component 3, the probe 9a can simultaneously detect a flaw to a depth corresponding to a plurality of layers (for example, corresponding to five layers) of the metal powder 2.

When there is a flaw C in the surface layer 3a, a change occurs in a flow of the eddy current, and this changes the magnetic field. The presence or absence of the flaw C can be detected by the detection coils 22 detecting a change in magnetic field. There are cases where one of the pair of detection coils 22 detects a change in magnetic field and the other detects no change in magnetic field. In such a case, a change in magnetic field can be detected accurately by calculating a difference between signals detected by the pair of detection coils 22. The difference between signals detected by the plurality of detection coils 22 is calculated in this manner, so that the difference between signals becomes the largest when the probe 9a passes over above the flaw C. Therefore, electrical noise can be curbed, and thus the flaw C can be detected accurately. Examples of the flaw C detected by the detection coils 22 include defective penetration, cracking, fusion, and porosity (aperture).

Figure 3:
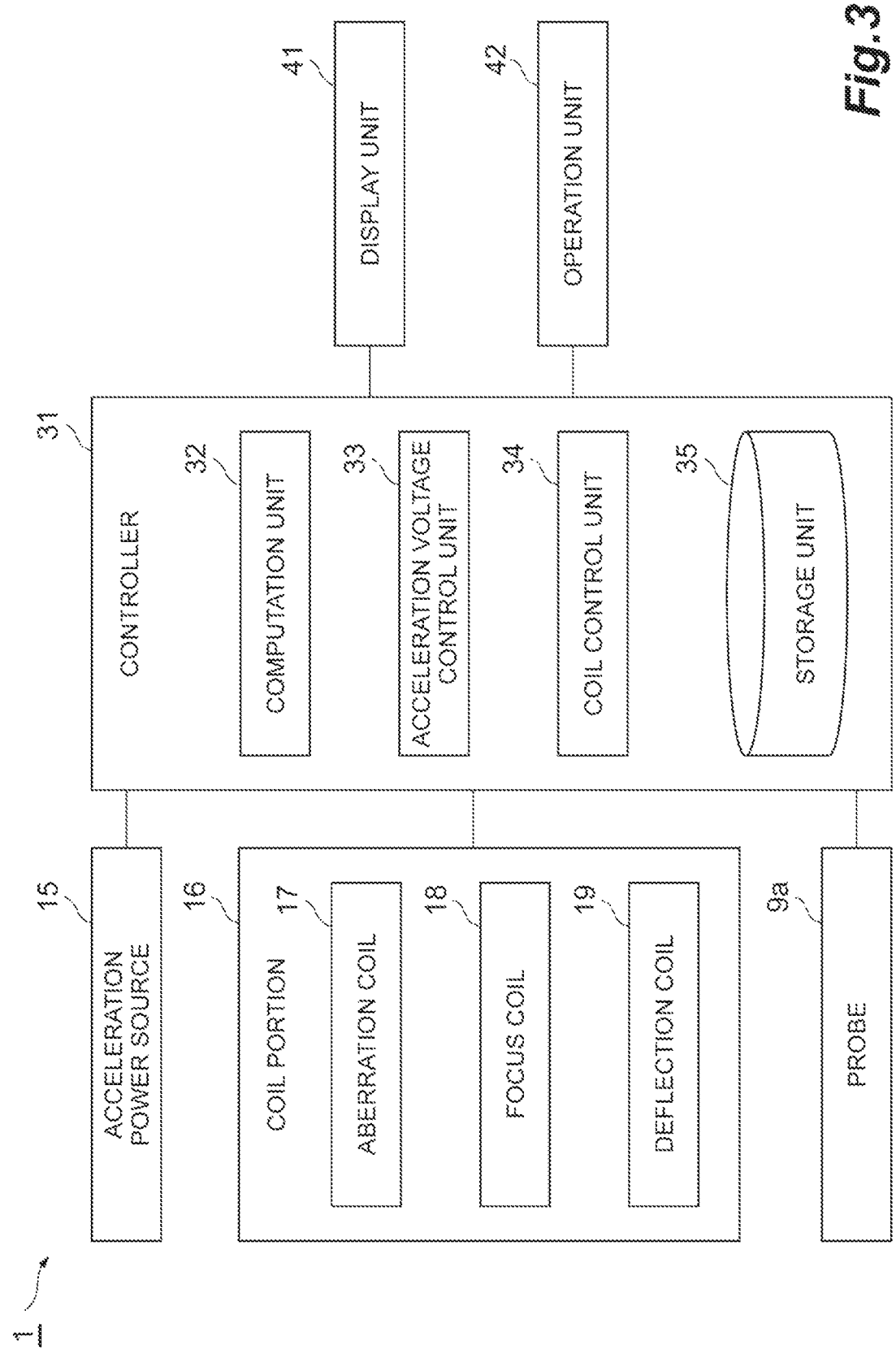
FIG. 3 is a block diagram of the constitution of the additive manufacturing device illustrated in FIG. 1.

The controller 31 illustrated in FIGS. 1 and 3 is a control unit conducting control of the entire manufacturing device 1. The controller 31 is a computer constituted of hardware such as a central processing unit (CPU), a read only memory (ROM), and a random access memory (RAM); and software such as a program stored in the ROM. The controller 31 includes an input signal circuit, an output signal circuit, a power source circuit, and the like. The controller 31 includes a computation unit 32, an acceleration voltage control unit (energy control unit) 33, a coil control unit (energy control unit) 34, and a storage unit 35. The controller 31 is electrically connected to the acceleration power source 15, the aberration coil 17, the focus coil 18, the deflection coil 19, the powder applying mechanism 12, the probe 9a, the elevating device 6, a display unit 41, and an operation unit 42.

The manufacturing device 1 is provided with the energy control unit controlling energy of the electron beam B. The controller 31 may include the acceleration voltage control unit 33 and the coil control unit 34 as the energy control units.

The computation unit 32 performs computation regarding signals detected by the probe 9a. For example, the computation unit 32 can calculate the difference between signals detected by the pair of detection coils 22. For example, the computation unit 32 can calculate the presence or absence of the flaw C, the position of the flaw C (the position in the X direction and the position in the Y direction), and the depth of the flaw C (position in the Z direction). The computation unit 32 outputs the calculated inspection results (result of flaw detection) to the display unit 41. The computation unit 32 stores the calculated inspection results in the storage unit 35.

The acceleration voltage control unit 33 controls the acceleration voltage applied by the acceleration power source 15. The acceleration voltage control unit 33 further increases the acceleration voltage than that during a normal time in accordance with the position and the depth of the detected flaw C. An acceleration voltage during a normal time indicates an acceleration voltage when there is no need to repair the flaw C. For example, an acceleration voltage during a normal time an acceleration voltage required for irradiation of the electron beam B which can melt the metal powder 2 for one layer. The acceleration voltage control unit 33 increases the speed of electrons of the electron beam B by increasing the acceleration voltage. When the metal powder 2 deposited on the three-dimensional component 3 is melted, the acceleration voltage control unit 33 performs control of increasing the acceleration voltage at a timing when the flaw C is irradiated with the electron beam B. After the acceleration voltage is increased, the acceleration voltage control unit 33 performs control of reducing the acceleration voltage such that it returns to a value during a normal time when a position deviating from the flaw C is irradiated with the electron beam B.

The coil control unit 34 controls the aberration coil 17 such that the electron beam B converges. The coil control unit 34 controls the focus position of the electron beam B by controlling the focus coil 18. The coil control unit 34 controls the irradiation position of the electron beam B by controlling the deflection coil 19. For example, when the acceleration voltage is further increased than that during a normal time, the behavior of the electron beam B changes. Therefore, the coil control unit 34 can correct the control amount in the aberration coil 17, the control amount in the focus coil 18, and the control amount in the deflection coil 19. For example, data related to the control amount in the aberration coil 17, the control amount in the focus coil 18, and the control amount in the deflection coil 19 is stored in the storage unit 35.

For example, the display unit 41 is a liquid crystal display device and can display inspection results or the like output from the controller 31. For example, the display unit 41 displays information related to the position, the depth, and the like of the detected flaw C. The display unit 41 can display information related to irradiation of the electron beam B from the electron gun 14. The display unit 41 can display data related to the acceleration voltage, the control amount of the aberration coil 17, the control amount of the focus coil 18, and the control amount of the deflection coil 19. The operation unit 42 is an input means which can be operated by a user. A user checks for information displayed by the display unit 41 and can change various kinds of setting (control amounts).

Next, a method for manufacturing a three-dimensional component (ADDITIVE MANUFACTURING METHOD) will be described. FIG. 5 is a flowchart showing a procedure of the method for manufacturing a three-dimensional component. For example, the method for manufacturing a three-dimensional component is executed using the manufacturing device 1.

First, in the manufacturing device 1, the metal powder 2 is discharged from the raw material tanks 11, and the metal powder 2 for the first layer is supplied to a part on the work table 5. The powder applying mechanism 12 is moved in the Y direction, and the outer surface 2a of the laminate of the metal powder 2 is leveled (Step S1). Next, an irradiating step of irradiating the metal powder 2 on the work table 5 with the electron beam B is performed (melting step; Step S2). In this irradiating step, the acceleration voltage control unit 33 controls the acceleration voltage by controlling the acceleration power source 15. Accordingly, electrons are accelerated and irradiation of the electron beam B is performed from the electron gun 14. In the irradiating step, the coil control unit 34 causes the electron beam B to converge by controlling the aberration coil 17, controls the focus position of the electron beam B by controlling the focus coil 18, controls the irradiation position of the electron beam B by controlling the deflection coil 19, and controls the scanning speed of the electron beam B.

Next, the controller 31 transmits a command signal to the elevating device 6 to cause the work table 5 to move downward (Step S3). Accordingly, a space for laminating the metal powder 2 of the second layer on the first layer is ensured.

In the manufacturing device 1, after the melted metal powder 2 of the first layer (nth layer) is hardened, the metal powder 2 of the second layer (n+1th layer) is supplied to a part on the work table 5 (on the metal powder 2 of the nth layer) (laminating step), the powder applying mechanism 12 is moved in the Y direction, and the outer surface 2a of the metal powder 2 of the second layer is leveled (Step S4). At this time, a flaw detecting step (nondestructive inspection step; Step S5) is executed when the powder applying mechanism 12 is moved. For example, the outer surface 2a of the metal powder 2 of the second layer (n+1th layer) is leveled, and the flaw detecting step is executed for the surface layer 3a of the first layer (nth layer).

In the flaw detecting step, an excitation step and a detecting step are performed. In the excitation step, an eddy current is generated in the surface layer 3a by supplying a current to the excitation coil 21 such that a magnetic field is generated. In the detecting step, a change in magnetic field in the surface layer 3a is detected. For example, when there is the flaw C, a discontinuous shape part, or the like in the surface layer 3a, the eddy current bypasses and changes so that the magnetic field changes. In the detecting step, the computation unit 32 calculates the difference between signals detected by the pair of detection coils 22. The computation unit 32 generates image information showing inspection results based on the calculated results. The image information showing inspection results is output to the display unit 41 and is displayed. The display unit 41 may display a position, a magnitude, a direction, and the like of the flaw C as image information showing inspection results.

Next, the computation unit 32 determines the presence or absence of the flaw C based on the inspection results (Step S6). Here, the computation unit 32 may determine the presence or absence of the flaw C based on the difference between signals detected by the pair of detection coils 22 or may determine the presence or absence of the flaw C by a user seeing the image information displayed by the display unit 41. When the flaw C is not detected, the process proceeds to Step S8, and when the flaw C is detected, the process proceeds to Step S7.

In Step S7, a repair preparing step is performed. In the repair preparing step, the controller 31 performs various kinds of setting for repairing the flaw C. In the repair preparing step, the controller 31 sets a repairing region including the flaw C, for example. In the repair preparing step, the controller 31 sets the control amount of the acceleration power source when a repairing region including the flaw C is irradiated with the electron beam B. For example, the controller 31 sets the control amount of the acceleration power source 15 such that the acceleration voltage is increased. In the repair preparing step, the controller 31 sets the control amount of the coil portion 16 when the acceleration voltage is increased. For example, the controller 31 can set the control amount of the aberration coil 17, the control amount of the focus coil 18, and the control amount of the deflection coil 19 in accordance with the increase amount of the speed of electrons in the electron beam B. In the repair preparing step, the foregoing control amounts are set based on the position, the magnitude, and the shape of the flaw C, the control amount of the electron beam B in the past, and the like. The control amounts thereof may be set by a user or may be set through computation of the computation unit 32. The set control amounts are stored in the storage unit 35. A repairing region including the flaw C may be only the flaw C, may include a region around the flaw C, and may include only a part of the flaw C.

After the repair preparing step of Step S7 is performed, the process returns to Step S2. In this irradiating step of Step S2, the electron ray irradiation device 8 irradiates the metal powder 2 of the second layer laminated on the first layer with the electron beam B. In this Step S2, when a repairing region including the flaw C is irradiated with the electron beam B, control is executed based on the control amount set in the repair preparing step, so that the acceleration voltage is increased and the coil portion 16 is controlled. Accordingly, energy of the electron beam B increases, the electron beam B reaches the flaw C, and the flaw C is melted. In this manner, the repairing step of repairing the flaw C is performed. In the irradiating step, when a region other than the repairing region in the metal powder 2 of the second layer is irradiated with the electron beam B, it is irradiated with the electron beam B, similar to when the metal powder 2 of the first layer is irradiated with the electron beam B in the preceding stage. That is, when the irradiation position of the electron beam B moves and it deviates from a repairing position including the flaw C, the acceleration voltage control unit 33 causes the acceleration voltage to return to the original value.

When the irradiating step of this Step S2 has been performed, Steps S3 to S6 are repeated. In Step S6, when it is determined that there is no flaw, the process proceeds to Step S8. In Step S8, the controller 31 determines whether or not shaping of all the layers of the three-dimensional component 3 has ended and a component has been brought to completion. For example, it determines whether or not shaping for layers has ended as designed. When shaping of a three-dimensional component has not ended, the process returns to Step S2. In this Step S2, the electron ray irradiation device 8 performs melting by partially applying energy to the metal powder 2 formed in the preceding Step S4 through irradiation of the electron beam B. Hereinafter, the manufacturing device 1 performs shaping of all the layers of the three-dimensional component 3 by repeating similar steps, thereby completing manufacturing of the three-dimensional component 3.

In the manufacturing device 1 of the present embodiment, since the nondestructive inspection device 9 is provided, the flaw C in the surface layer 3a of the three-dimensional component 3 can be detected by this nondestructive inspection device 9. Since the manufacturing device 1 is provided with the acceleration voltage control unit 33, when a repairing region including the flaw C detected by the nondestructive inspection device 9 is irradiated with the electron beam B, energy of the electron beam B can be increased. Accordingly, while the metal powder 2 of the second layer is irradiated with the electron beam B, the manufacturing device 1 can apply energy of the electron beam B to the flaw C present in the first layer below thereof. As a result, the flaw C can be repaired.

The present disclosure is not limited to the embodiment described above, and various modifications can be made as follows within a range not departing from the gist of the present invention. In the foregoing embodiment, energy of the electron beam B is increased by performing control of increasing the acceleration voltage. However, control of increasing energy of a beam is not limited thereto. For example, the controller 31 may reduce the moving speed of the irradiation position of the electron beam B by reducing the scanning speed of the electron beam B, such that energy applied to a conductive powder may be increased. That is, when a repairing region is irradiated with the electron beam B, the coil control unit 34 may perform control of further reducing the scanning speed of the electron beam B than that during a normal time. The coil control unit 34 may perform control of increasing the acceleration voltage and control of reducing the scanning speed at the same time. That is, the scanning speed may be reduced while the acceleration voltage is increased. In the foregoing embodiment, when the flaw C is detected, the manufacturing device 1 can repair the flaw C by irradiating a repairing region including the flaw C again with the electron beam B.

In the foregoing embodiment, a conductive powder is melted through irradiation of the electron beam B. However, a beam for irradiating a conductive powder is not limited to an electron beam and may be a different energy beam. For example, the additive manufacturing device may be provided with a laser transmitter melting a conductive powder through irradiation of a laser beam. In this manner, when irradiation of a laser beam is performed, the coil control unit may perform control of increasing an output of a laser beam or may perform control of reducing the scanning speed of a laser beam. Accordingly, when a repairing region is irradiated with a beam, a flaw can be repaired by increasing energy of the beam.

In the foregoing embodiment, regarding the nondestructive inspection unit detecting a flaw in the surface layer 3a of the three-dimensional component 3, a case where a flaw is detected by generating an eddy current in the three-dimensional component 3 (eddy current flaw detection test) has been described. However, the nondestructive inspection unit is not limited to a unit performing the eddy current flaw detection test. For example, the nondestructive inspection unit may perform a different nondestructive inspection such as a radiation transmission test. The nondestructive inspection unit may include a camera (image capturing unit) and may set a repairing region by detecting a flaw based on a captured image.

In the foregoing embodiment, the outer surface 2a of a laminate (powder layer) of a powder is leveled by moving the powder applying mechanism in the Y direction. However, the outer surface 2a of a powder layer may be leveled by moving the powder applying mechanism in a different direction within an X-Y plane. The manufacturing device may move the powder applying mechanism in a circumferential direction. The manufacturing device may level the outer surface 2a by relatively moving a shaping tank including a work table with respect to the powder applying mechanism in a plan view. For example, the shaping tank (guide portion) may have a constitution of reciprocating in the X direction or may have a constitution capable of moving in other directions. The shaping tank may have a constitution capable of rotatably moving about a virtual line extending in the Z direction. For example, the manufacturing device may have a constitution provided with a holding unit (work table) having a circular shape in a plan view, sequentially performing applying of a powder and irradiation of a beam while the holding unit and the powder layer are rotatively moved about a virtual line (center portion of the holding unit) extending in the Z direction.

REFERENCE SIGNS LIST

1 Manufacturing device (additive manufacturing device)
2 Metal powder (conductive powder)
3 Three-dimensional component (additively manufactured article)
3a Surface layer
5 Work table (holding unit)
8 Electron ray irradiation device (beam irradiation unit)
9 Nondestructive inspection device (nondestructive inspection unit)
9a Probe
14 Electron gun
15 Acceleration power source
16 Coil portion
33 Acceleration voltage control unit (energy control unit)
34 Coil control unit (energy control unit)
B Electron beam (electron ray)
C Flaw

The invention claimed is:

1. An additive manufacturing device comprising:
a beam irradiation unit irradiating a conductive powder disposed in a layered shape with a beam;
a nondestructive inspection unit detecting a flaw in a surface layer of an additively manufactured article formed of hardened conductive powder; and
an energy control unit controlling energy of the beam,
wherein the energy control unit increases energy of the beam when a repairing region, set in accordance with results of flaw detection by the nondestructive inspection unit, is irradiated with the beam,
wherein the beam irradiation unit is provided with
an electron gun performing emission of an electron ray serving as the beam,
an acceleration power source supplying an acceleration voltage to the electron gun, and
a coil portion forming a magnetic field in a region in front of an irradiation port of the electron gun,
wherein the energy control unit includes
an acceleration voltage controller controlling the acceleration voltage, and
a coil controller controlling the beam by the coil portion,
wherein the nondestructive inspection unit is a probe, and
wherein the probe includes a plurality of inspection coils disposed side by side, each of the inspection coils provided with an excitation coil and a plurality of detection coils.

2. The additive manufacturing device according to claim 1,
wherein the acceleration voltage controller increases the acceleration voltage when the repairing region is irradiated with the electron ray.

3. The additive manufacturing device according to claim 1,
wherein the coil controller reduces a scanning speed of the electron ray when the repairing region is irradiated with the electron ray.

4. An additive manufacturing method for manufacturing a three-dimensional laminate shaped article by irradiating a conductive powder disposed in a layered shape with a beam and melting and hardening the conductive powder, the additive manufacturing method comprising:
a melting step of melting the conductive powder of a first layer by irradiating the conductive powder of the first layer held by a holding unit with the beam;
a nondestructive inspection step of detecting a flaw in a surface layer of the three-dimensional laminate shaped article after the conductive powder of the first layer has been melted and hardened;
a laminating step of laminating the conductive powder of a second layer on the three-dimensional laminate shaped article; and
a repairing step of repairing a region set in accordance with results of flaw detection in the nondestructive inspection step,
wherein in the repairing step, when the conductive powder of the second layer is irradiated with the beam, the region is repaired by increasing energy of the beam.

* * * * *